United States Patent [19]

Ellis et al.

[11] 4,134,820
[45] Jan. 16, 1979

[54] SEPARATION OF PARTICULATE MATERIAL FROM SLUDGE, SLURRIES AND LIKE FLOWABLE MATERIAL

[75] Inventors: David Ellis, New Brighton, Wales; John G. Sunderland, Tarvin, England

[73] Assignee: The Electricity Council, England

[21] Appl. No.: 853,017

[22] Filed: Nov. 17, 1977

[30] Foreign Application Priority Data

Nov. 17, 1976 [GB] United Kingdom ............... 47980/76

[51] Int. Cl.² ............................................. B01D 13/02
[52] U.S. Cl. ............................ 204/300 R; 204/180 R; 204/299 R; 204/301
[58] Field of Search ............... 204/149, 152, 202, 206, 204/216, 301, 299, 300

[56] References Cited

U.S. PATENT DOCUMENTS

| | | | |
|---|---|---|---|
| 3,920,530 | 11/1975 | Xylander | 204/152 |
| 4,001,100 | 1/1977 | Haydock | 204/180 R |
| 4,003,819 | 1/1977 | Kunkle et al. | 204/301 |

*Primary Examiner*—Arthur C. Prescott
*Attorney, Agent, or Firm*—Beveridge, DeGrandi, Kline & Lunsford

[57] ABSTRACT

Apparatus for the electrophoretic separation of particulate material from a sludge, slurry or the like has an L-shaped scraper or scrapers mounted on an endless chain for removing the particulate material from the surface of the anode. A cam-driven collector engages the scraper or scrapers to remove the material therefrom so that it falls downwardly to removal means.

19 Claims, 1 Drawing Figure

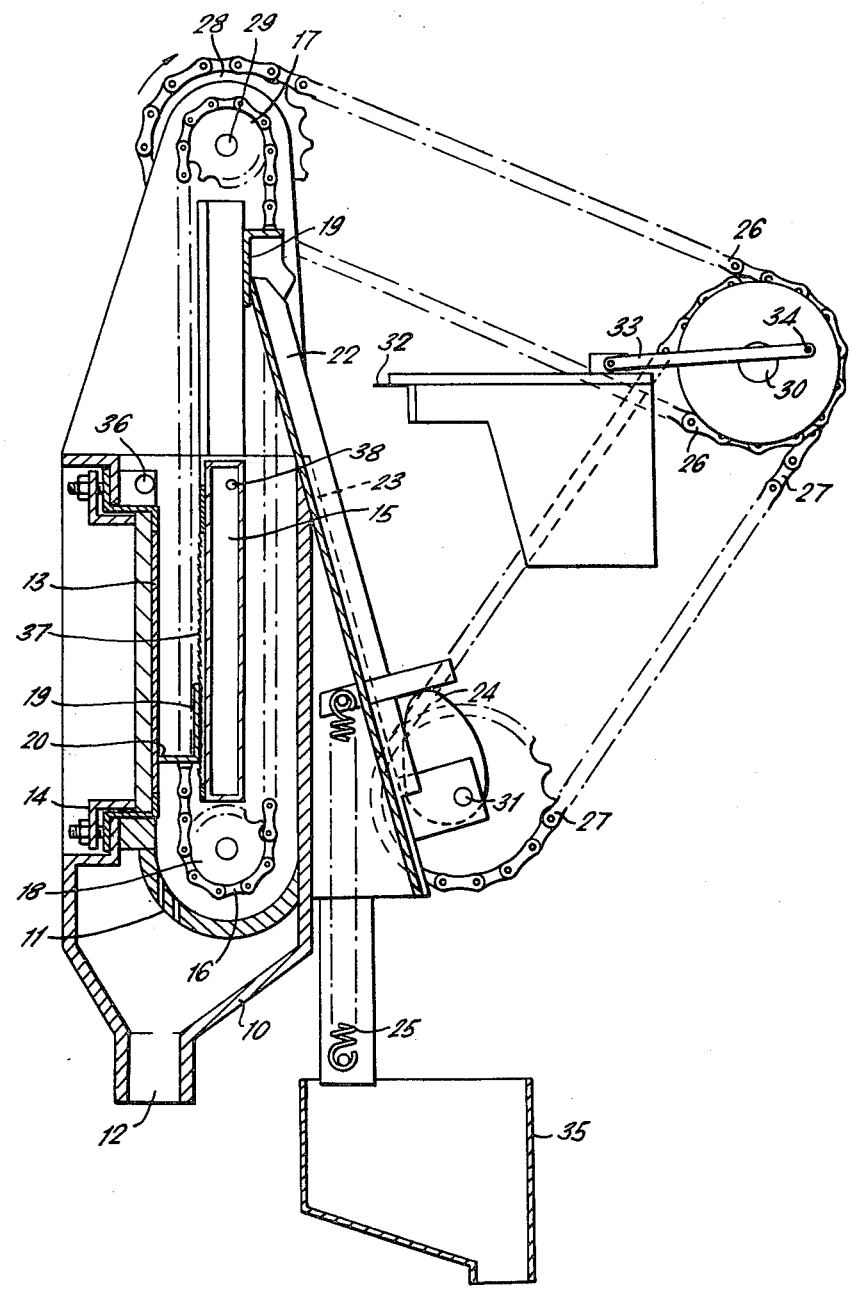

SEPARATION OF PARTICULATE MATERIAL FROM SLUDGE, SLURRIES AND LIKE FLOWABLE MATERIAL

BACKGROUND OF THE INVENTION

1. Field of the Invention

This invention relates to apparatus for the separation of particulate material from sludge, slurries and like flowable material.

2. Prior Art

Electrophoretic dewatering of flowable material containing solid particles for example clay suspensions, is well-known. If the suspension is introduced between an anode and a cathode, the solid particles are attracted to the anode. For large-scale commercial separation, a continuous process plant is desirable and a common practice has been to use a rotating drum-type of anode onto which the particulate material is deposited and from which this material is removed by a scraper or the like. U.S. Pat. Nos. 3,980,547, 4,003,811 and 4,003,819 are examples of such electrophoretic separation apparatus.

BRIEF SUMMARY OF THE INVENTION

It is an object of the present invention to provide an improved means for removing the particulate material separated from a suspension by electrophoretic treatment.

According to this invention apparatus for removing particulate material from a sludge or like flowable material containing solid particles comprises a container having an anode with a vertical or substantially vertical surface, a cathode in said container spaced away from the anode and facing the anode and an endless flexible element arranged to carry at least one scraper upwardly adjacent that surface of the anode which faces the cathode, the flexible element being arranged to carry the scraper around an endless path for repetitive passage adjacent the anode surface, said scraper extending in a substantially horizontal plane across the whole width of the anode surface so that material deposited on the anode or at least some of that material is scraped off onto the upper side of the scraper as that scraper moves upwardly and a movable collector arranged to engage the or each scraper on the endless flexible element as that scraper moves downwardly so as to remove material therefrom and then to move clear of the scraper and return to a position to engage the next scraper.

In one form of construction the movable collector has an upper edge normally positioned to engage the or each scraper on the endless flexible element as that scraper moves downwardly, said collector being mounted for movement in a direction downwardly and outwardly away from the downward path of the scraper or scrapers, with biasing means arranged to keep the collector pushed upwardly in contact with the downwardly-moving scraper, whereby, as the scraper or scrapers move downwardly, the collector moves outwardly away from the scraper path and hence scrapes the material outwardly off the scraper. In this construction, the biasing means may comprise spring means or a counterweight. The collector edge will bear against the scraper, being urged by the bias force against the scraper. If the scraper surface is, for example, vertical, the collector will move over the scraper surface as the scraper moves downwardly so removing material therefrom. If the collector meets an outwardly extending part of the scraper, the collector will be forced downwardly against the bias force and so will move outwardly, riding against the scraper surface and being forced outwardly until it is eventually clear of the scraper. It then moves upwardly under the bias force.

Instead of biasing the collector upwardly, driving means may be provided driving the collector in synchronism with the movement of the scraper so that the collector moves over a surface of the scraper and then moves clear of the scraper and returns to a position to engage the next scraper. The driving means may, for example, be a cam.

The collector may be a slide movable in a guide. In such an arrangement the collector conveniently is a plate, for example a flat plate arranged at an acute angle to the downward path of the scraper or scrapers and mounted for movement in its own plane.

With this arrangement, the sludge or slurry to be dewatered may be fed continuously into said container; an overflow outlet may be provided near the top of the container. Preferably the material is fed in near the bottom of the container. The anode and cathode are conveniently flat plates with the endless scraper carrier arranged to pass around the cathode structure travelling up between the cathode and anode and downwardly on the other side of the cathode. The solid particles are attracted to the anode and collect thereon. The scraper or scrapers conveniently are arranged to move closely adjacent the anode although not in contact therewith so as to scrape a layer of thickened material off the anode. In some cases, however, it may be preferred to have a scraper making contact with the anode.

Preferably the endless flexible element is arranged to carry the scraper or scrapers upwardly out of the top of the container and the collector is arranged to engage the or each scraper on its downward travel before the scraper re-enters the fluid in said container. As the scraper or each scraper moves downwardly, if the scraper is spring-biased, it presses the collector downwardly and, because of the constraint on this movement, the collector moves outwardly across the width of the scraper to remove the material collected thereon. If the scraper is driven, e.g. by a cam, the collector is moved relatively to the scraper to remove material therefrom and is also moved downwardly and outwardly so that it moves clear of the scraper before returning.

The endless flexible element conveniently comprises a chain or chains. The scraper or each scraper may comprise an element which is L-shaped in vertical section with a horizontal plate having one edge adjacent the anode and having, at or near the other edge, a vertical position which extends upwardly when the scraper is moving upwardly on the material-collecting part of its movement. In such a construction, said collector may be arranged to engage said vertical plate during downward movement of the scraper and is linearly movable outwardly and downwardly away from that plate and driven means may be provided operative to move below the underside of said horizontal plate during downward movement of the scraper to remove collected material therefrom.

If the material is fed into the container near the bottom thereof, particles will be attracted towards the anode as the material moves upwardly. Depending on the rate of input and the other parameters of the system, the overflow at the top may be substantially clear electrolyte or may be a slurry having a substantially reduced particulate content compared with the input material. It is preferred to put a fine cloth in front of the cathode structure, between the cathode and anode, and to draw off the liquid from the region between this cloth and the cathode. By using this technique, it is possible to draw off substantially clear catholyte.

BRIEF DESCRIPTION OF THE DRAWING

The accompanying drawing is a diagrammatic vertical section through an apparatus for dewatering a clay suspension.

DESCRIPTION OF THE PREFERRED EMBODIMENT

Referring to the drawing there is shown a container 10 within which is an apertured element 11 forming a distributor for material fed into a main inlet 12. This inlet 12 is near the bottom of the container 10. The material to be dewatered, in this case a clay suspension, is fed into the inlet 12. In the container 10 is an anode 13 comprising a flat plate of lead or other suitable material which is secured in position by an anode clamp frame 14. Facing the anode is a vertical cathode 15 which may be mesh or may be a plate and which conveniently is formed of stainless steel although other inert materials may be empolyed. An endless chain 16 extends around the cathode 15 and is driven by a drive sprocket 17 at its upper end and passes over an idler sprocket 18 at its lower end. On this chain are carried one or more anode scraper elements 19 which, as shown in the drawing, are L-shaped in transverse section. Each scraper element 19 has an edge 20 lying parallel to and closely adjacent the anode surface. Typically the separation might be upward of 1 mm. In some cases the scraper element may be in contact with the anode surface. The chain 16 is driven in the direction to carry each scraper element 19 upwardly across the face of the anode 13 so scraping accumulated material therefrom and carrying it upwardly out of the container 10 and over the top of the drive sprocket 17.

A collector 22 comprising a flat plate mounted in a guide 23 for linear movement in a downwardly and outwardly direction away from the downward path of the chain 16 is mounted so that it engages each scraper element 19 on its downward path. The collector 22 is biased upwardly. In the simplest arrangement, the collector 22 might be urged upwardly by a spring or by a counterweight. In such a construction, the collector would bear against the scraper as the latter moves downwardly. Material would thus be removed from any vertical surface of the scraper element. If the collector meets, for example, a horizontal surface on the scraper element, the collector would be pushed downwardly and so would move outwardly, riding across that horizontal surface until the collector is clear of the scraper element. The collector would then be moved upwardly by the spring or counterweight. Thus the collector will move over the scraper surface and will re-position itself to engage the next scraper element.

In the embodiment illustrated, the collector is moved by a cam 24, the collector being pulled downwardly by a spring 25 so as to remain in contact with the cam 24.

The cam 24 is driven in synchronism with the movement of the scraper, for example by chain drives 26, 27. Chain 26, driven from a sprocket 28 on a drive shaft 29 for the aforementioned sprocket 17, drives a sprocket on an auxiliary shaft 30 which in turn, by means of further sprockets, drives a shaft 31 carrying the cam 24.

This cam is driven in a clockwise direction (as viewed in the drawing) and is shaped so that, from the position illustrated, the slide 22 moves slowly downwards to its lowest position, and, after a dwell period, rapidly moves back upwardly. The scraper 19 is moving steadily downwards during all this time. During the last part of the upward movement of slide 22 and during a short dwell period at the top of the movement, the slide 22 moves over the vertical surface of the scraper 19 and removes material therefrom. This material falls down the slide 22 which is a plate-structure forming a chute for guiding the collected solid material into a hopper 35 or other removal means, e.g. a conveyor. An auxiliary blade 32 is reciprocated in a horizontal direction by means of a connecting rod 33 and eccentric 34 on the drive sprocket for chain 27. The timing of this movement is such that the blade 32 moves inwards towards the collector 22 so as to meet the collector 22 when nearing the bottom of its fall, thereby removing material therefrom as the collector is driven upwards by the cam 24, so causing the material to move down the collector 22 to fall into the hopper 35 or onto a conveyor or other disposal means. The downward movement of the collector 22 causes movement outwardly away from the scraper and eventually the collector moves clear of the scraper and is then returned rapidly upwards by the cam for the next cycle of operation.

An overflow outlet 36 near the top of the container allows surplus water or a slurry with a much reduced particulate content, depending on the process parameters, to pass out of the container 10 as the new material is admitted through the inlet 11 at the bottom of the container.

In some cases it may be preferable to provide a fine mesh cloth 37 in front of the cathode, typically about 1 to 5 mm in front of the cathode and facing the anode. The outlet may then be arranged between this cloth and the cathode enabling substantially clear water to be drawn off from the region of the cathode. This cloth permits the passage of water (which, by electro-osmotic action, moves towards the cathode) but holds back gross particulate material in the suspension and prevents mixing due to gas evolution at the cathode. The cathode structure is conveniently apertured and hollow so that the water passes into the cathode structure and may be drawn off through an outlet 38.

Although the apparatus has been described more particularly for the dewatering of a clay suspension, it may be used for dewatering of other materials. Depending on the nature of the sludge, slurry or the like to be treated, the materials for the anode, cathode etc. would have to be appropriately chosen.

For dewatering a clay suspension, the anode may be lead or an alloy of lead but other materials such as aluminium, iron zinc, nickel platinised titanium or lead dioxide on titanium may be employed. In some cases it may be preferred to cover the anode with a fine polyester cloth or other acid-resistant open mesh material. Such a material preferably has a very fine mesh, typically of 5 micron size and possibly up to say 0.2 mm. Such a fine mesh cloth may be desirable if lead is used for the anode, the cloth preventing particles of lead dioxide from contaminating the collected particulate material from the suspension.

In some cases an inert anode electrode may be used which is electrically coupled with a slowly-corroding electrode, e.g. alternate strips of the two materials, to provide ions in the solution for coagulating collected particles.

We claim:

1. Apparatus for removing particulate material from a sludge or like flowable material containing solid particles comprising a container having a fixed position anode with a vertical or substantially vertical surface, a fixed position cathode in said container spaced away from the anode and facing the anode, an endless flexible driven element, at least one scraper mounted on said flexible element to be carried upwardly adjacent that surface of the anode which faces the cathode, the flexible element being arranged to carry the scraper around an endless path for repetitive passage adjacent the anode surface, said scraper extending in a substantially horizontal plane across the whole width of the anode surface so that material deposited on the anode or at least some of that material is scraped off onto the upper side of the scraper as that scraper moves upwardly, and a movable collector arranged to engage the or each scraper on the endless flexible element as that scraper moves downwardly so as to remove material therefrom and then to move clear of that scraper and return to a position to engage the next scraper.

2. Apparatus as claimed in claim 1 wherein the movable collector has an upper edge normally positioned to engage the or each scraper on the endless flexible element as that scraper moves downwardly, said collector being mounted for movement in a direction downwardly and outwardly away from the downward path of the scraper or scrapers, with biasing means arranged to keep the collector pushed upwardly in contact with the downwardly-moving scraper, whereby, as the scraper or scrapers move downwardly, the collector moves outwardly away from the scraper path and hence scrapes the material outwardly off the scraper.

3. Apparatus as claimed in claim 2 wherein the biasing means comprise spring means.

4. Apparatus as claimed in claim 1 wherein the biasing means comprise a counterweight.

5. Apparatus as claimed in claim 1 wherein the movable collector has an upper edge normally positioned to engage the or each scraper on the endless flexible element as that scraper moves downwardly, said collector being mounted for movement in a direction downwardly and outwardly away from the downward path of the scraper or scrapers, with driving means driving the collector in synchronism with movement of the scraper so that the collector moves over a surface of the scraper and then moves clear of that scraper and returns to a position to engage the next scraper.

6. Apparatus as claimed in claim 5 wherein the driving means comprise a cam.

7. Apparatus as claimed in claim 1 wherein the collector comprises a slide movable in a guide.

8. Apparatus as claimed in claim 1 wherein the collector is a plate.

9. Apparatus as claimed in claim 8 wherein said plate is a flat plate arranged at an acute angle to the downward path of the scraper or scrapers and mounted for movement in its own plane.

10. Apparatus as claimed in claim 1 and having an overflow outlet near the top of the container.

11. Apparatus as claimed in claim 1 and having inlet means near the bottom of the container.

12. Apparatus as claimed in claim 1 wherein the anode and cathode are flat plates with the endless scraper carrier arranged to pass around the cathode structure travelling up between the cathode and anode and downwardly on the other side of the cathode.

13. Apparatus as claimed in claim 12 wherein the scraper or scrapers are arranged to move closely adjacent the anode although not in contact therewith so as to scrape a layer of thickened material off the anode.

14. Apparatus as claimed in claim 12 wherein the scraper or scrapers are arranged to move in contact with the anode.

15. Apparatus as claimed in claim 12 wherein the endless flexible element is arranged to carry the scraper or scrapers upwardly out of the top of the container and the collector is arranged to engage the or each scraper on its downward travel before the scraper re-enters the fluid in said container.

16. Apparatus as claimed in claim 12 wherein the endless flexible element comprises a chain.

17. Apparatus as claimed in claim 1 wherein the scraper or each scraper comprises an element which is L-shaped in vertical section with a horizontal plate having one edge adjacent the anode and having, at or near the other edge, a vertical portion which extends upwardly when the scraper is moving upwardly on the material-collecting part of its movement.

18. Apparatus as claimed in claim 17 wherein said collector is arranged to engage said vertical plate during downward movement of the scraper and is linearly movable in a direction outwardly and downwardly away from that plate and wherein driven means are provided operative to move below the underside of said horizontal plate during downward movement of the scraper to remove collected material therefrom.

19. Apparatus as claimed in claim 1 and having a fine cloth in front of the cathode structure, between the cathode and anode, and wherein means are provided to draw off the liquid from the region between this cloth and the cathode.

* * * * *